(12) United States Patent
Ota

(10) Patent No.: US 7,149,351 B2
(45) Date of Patent: Dec. 12, 2006

(54) IMAGE PROCESSING APPARATUS AND METHOD, COMPUTER PROGRAM AND COMPUTER-READABLE STORAGE MEDIUM

(75) Inventor: Takatoshi Ota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1040 days.

(21) Appl. No.: 10/260,559

(22) Filed: Oct. 1, 2002

(65) Prior Publication Data
US 2003/0067633 A1    Apr. 10, 2003

(30) Foreign Application Priority Data
Oct. 4, 2001   (JP) ............................. 2001-308833

(51) Int. Cl.
*G06K 9/00*    (2006.01)
(52) U.S. Cl. ..................... 382/167; 382/237; 382/252
(58) Field of Classification Search ................ 382/167, 382/252, 237, 162; 358/1.9, 3.03, 474, 1.12–1.13, 358/1.15–1.16, 296, 500, 448, 536, 2.99–3.1, 358/534; 345/589, 89; 347/15, 19, 41
See application file for complete search history.

(56) References Cited

U.S. PATENT DOCUMENTS

| | | | | |
|---|---|---|---|---|
| 5,621,546 A | * | 4/1997 | Klassen et al. ............. | 358/536 |
| 5,949,965 A | | 9/1999 | Gondek ...................... | 358/1.9 |
| 5,973,803 A | | 10/1999 | Cheung et al. ............. | 358/534 |
| 6,363,172 B1 | * | 3/2002 | Cheung et al. ............. | 382/167 |
| 2002/0039118 A1 | | 4/2002 | Shibata ........................ | 347/15 |

FOREIGN PATENT DOCUMENTS

| | | |
|---|---|---|
| JP | 07-193726 | 7/1995 |
| JP | 08-279920 | 10/1996 |
| JP | 09-016756 | 1/1997 |
| JP | 11-10918 | 1/1999 |

OTHER PUBLICATIONS

"An Adaptive Algorithm For Spatial Greyscale", *Proceedings of the Society for Information Display* (1976) vol. 17, No. 2, 2nd Quarter, pp. 62 and 75-77.

* cited by examiner

*Primary Examiner*—Ishrat Sherali
(74) *Attorney, Agent, or Firm*—Fitzpatrick, Cella, Harper & Scinto

(57) ABSTRACT

An image processing apparatus having general versatility, for flexible quantization on multivalue image data of two or more colors to image data having a reduced number of bits in correspondence with the number of bits to be quantized, by using an error diffusion scheme. When two color multivalue data are inputted, errors distributed to the position are added to the data and inputted as $I'_0$ and $I'_1$ into an output determination unit 2. The input data $I'_0$ and $I'_1$ are quantized by using LUTs 7-0 and 7-1 into numerical values of less-value representation. The two data from the LUTs 7-0 and 7-1 are inputted into an LUT 4, as coordinate values in a two-dimensional coordinate system, and two color binarized bit data (total 2 bits) are outputted.

8 Claims, 16 Drawing Sheets

FIG. 5

| $O_0, O_1$ | $O'_0, O'_1$ |
|---|---|
| 0 | 0 |
| 1 | 255 |

FIG. 7

| $O_0, O_1$ | $O'_0, O'_1$ |
|---|---|
| 0 | 0 |
| 1 | 128 |
| 2 | 255 |

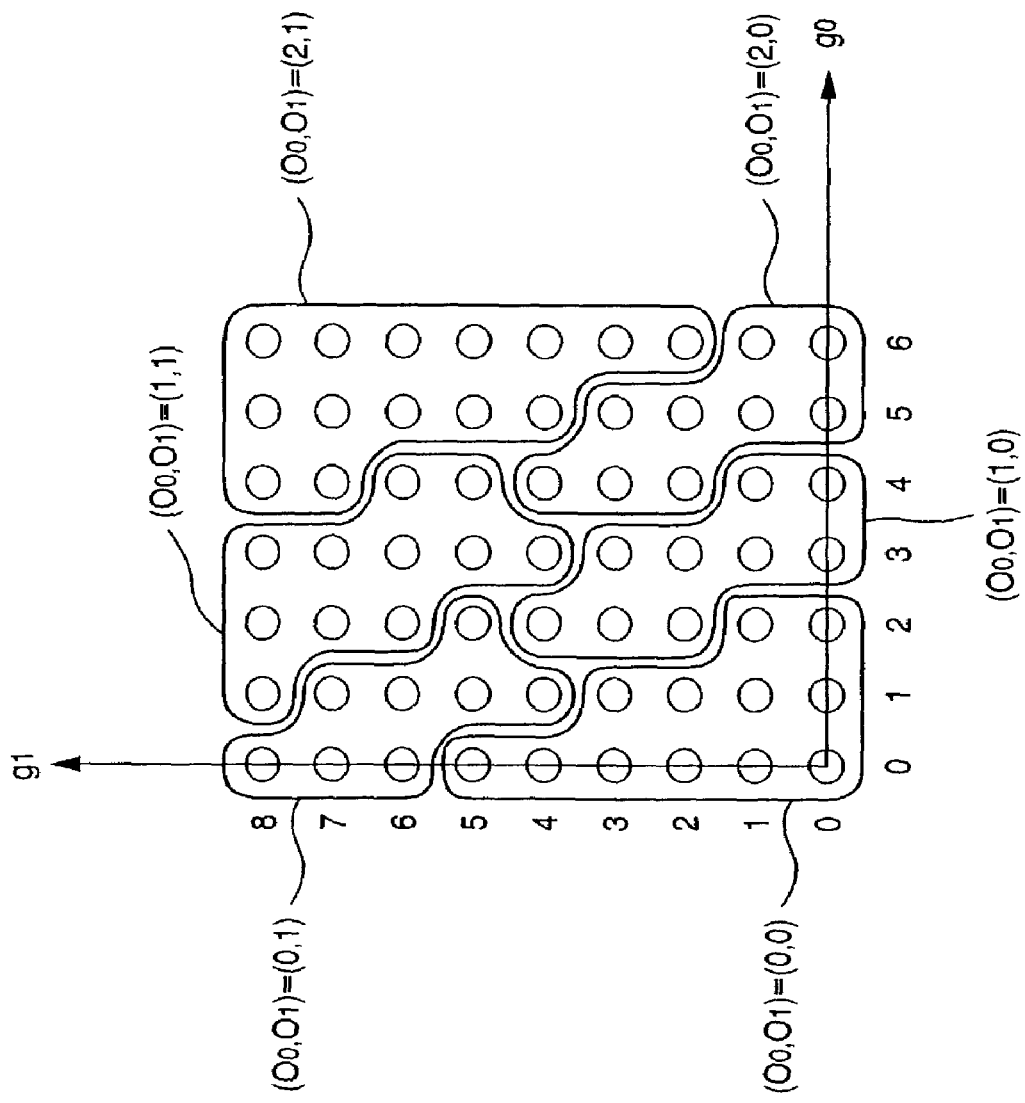

FIG. 9A

| O₀ | O'₀ |
|---|---|
| 0 | 0 |
| 1 | 128 |
| 2 | 255 |

FIG. 9B

| O₁ | O'₁ |
|---|---|
| 0 | 0 |
| 1 | 255 |

FIG. 10

| I0',I1' | g0,g1 |
|---|---|
| 383 | 8 |
| 382 | 8 |
| 381 | 8 |
| . | . |
| . | . |
| 256 | 6 |
| 255 | 6 |
| 254 | 6 |
| . | . |
| . | . |
| . | . |
| 2 | 2 |
| 1 | 2 |
| 0 | 2 |
| −1 | 2 |
| . | . |
| . | . |
| −127 | 0 |
| −128 | 0 |

FIG. 11

| l0',l1' | g0,g1 |
|---|---|
| 319 | 6 |
| 318 | 6 |
| 317 | 6 |
| . | . |
| . | . |
| 256 | 5 |
| 255 | 5 |
| 254 | 5 |
| . | . |
| . | . |
| . | . |
| 2 | 2 |
| 1 | 2 |
| 0 | 2 |
| −1 | 2 |
| . | . |
| . | . |
| −62 | 0 |
| −63 | 0 |

FIG. 14

| I0',I1' | g0,g1 | dp0,dp1 | dm0,dm1 |
|---|---|---|---|
| 383 | 8 | – | – |
| 382 | 7 | 63 | 1 |
| 381 | 7 | 62 | 2 |
| . | . | . | . |
| . | . | . | . |
| 256 | 6 | 1 | 63 |
| 255 | 6 | 0 | 64 |
| 254 | 5 | 63 | 1 |
| . | . | . | . |
| . | . | . | . |
| . | . | . | . |
| 2 | 2 | 2 | 62 |
| 1 | 2 | 1 | 63 |
| 0 | 2 | 0 | 64 |
| −1 | 1 | 63 | 1 |
| . | . | . | . |
| . | . | . | . |
| −127 | 0 | 1 | 62 |
| −128 | 0 | 0 | 63 |

IMAGE PROCESSING APPARATUS AND METHOD, COMPUTER PROGRAM AND COMPUTER-READABLE STORAGE MEDIUM

FIELD OF THE INVENTION

The present invention relates to image processing apparatus and its control method and computer program and a computer-readable storage medium for converting image data where plural colors are represented by multiple bits to image data where the plural colors are represented by reduced number of bits.

BACKGROUND OF THE INVENTION

Error diffusion is representative pseudo halftone processing for binary representation of multivalue image data ("An Adaptive Algorithm for Spatial Gray Scale" in society for Information Display 1975 Symposium Digest of Technical Papers, 1975, 36).

This scheme is converting input multivalue image such that the density of entire multivalue image and the density of entire binarized image are substantially the same, i.e., the density is preserved, as briefly described below.

Assuming that a pixel of interest P has a density V, and unbinarized peripheral pixels P0, P1, P2 and P3 have densities V0, V1, V2 and V3, and further, a threshold value for binarization is T, a binarization error E in the pixel of interest P is distributed to the positions of the peripheral pixels P0 to P3 by using weight coefficients W0, W1, W2 and W3. Assuming that the maximum density is Vmax, the minimum density, Vmin and binarized data of the pixel of interest is B, the above distribution is expressed as follows.

If $V \geq T$ holds, $B=1$, Error $E=V-V\text{max}$

If $V<T$ holds, $B=0$, Error $E=V-V\text{min}$ \quad (1)

Then, the values V0 to V3 upon distribution to unbinarized pixels P0 to P3 are, $V0 = V0 + E \times W0$ $V1 = V1 + E \times W1$ $V2 = V2 + E \times W2$ $V3 = V3 + E \times W3$ Note that to equalize the density of the entire image binarized from the input image, generally, $W0+W1+W2+W3=1$ holds. For example, $W0=7/16$, $W1=1/16$, $W2=5/16$ and $W3=3/16$ hold.

By using this scheme, even if a printer which merely print-outputs an input multivalue image by printing/not printing dots is used, a print output perceivable to human eye as an image having gradation (tonality image or halftone image) can be realized.

Regarding a color image printing, a color printer generally performs printing by using ink or toner (printing material) of yellow (Y), magenta (M), cyan (C) and black (Bk) color components. Accordingly, binarization is performed based on the above error diffusion scheme by color component and heads of respective printing components are driven based on the binarized results.

However, in a color image, a color is represented by a balance among 4 (3 if Bk component printing material is not used) color components. Accordingly, binarization independently on respective color components equals binarization without consideration of other color components. For example, if two or more colors often overlap with each other in a comparatively low-density region, satisfactory image quality cannot be attained.

As an example of improvement in this problem, Japanese Laid-open Patent Publication Nos. 8-279920 and 11-10918 are known. These publications disclose pseudo halftone processing for obtaining excellent visual characteristics even in a case where two or more colors overlap with each other by using error diffusion in combination of two or more colors.

However, in the method disclosed in the above publications, upon determination of output corresponding to an input pixel, an output value is determined by a comparator or the like. Accordingly, for example, if changing of output gray scale level is realized by hardware, the circuit is complicated, and if the above function is realized by hardware, the program size is large or more memory capacity is required.

Further, if output gray scale levels of two colors are different, e.g., cyan output is made in quaternary representation but magenta output is made in binary representation, or if the number of output colors is to three or more colors, the circuit or program must be greatly changed.

SUMMARY OF THE INVENTION

The present invention has been made in consideration of the above situation, and has its object to provide image processing apparatus and its method and computer program and computer-readable storage medium with general versatility, for flexible quantization on multivalue image data of two or more colors to image data having a reduced number of bits in correspondence with the number of bits to be quantized, by using an error diffusion scheme.

To attain the foregoing object, the image processing apparatus of the present invention has the following construction.

That is, provided is an image processing apparatus which quantizes $N(N \geq 2)$ color multivalue image data to data where each of color data representing the multivalue image data has a smaller number of bits, comprising: addition means for adding errors generated by quantization of respective colors to respective color multivalue data; a first look-up table for converting the results of addition by the addition means into multivalue data of smaller number of bits; a second look-up table for inputting output values of the respective colors from the first look-up table as N-dimensional addresses and outputting N quantized data; and calculation means for calculating differences between the quantized data outputted from the second look-up table and the respective colors added by the addition means, as errors to be added to unquantized pixel positions.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

Figure 5:
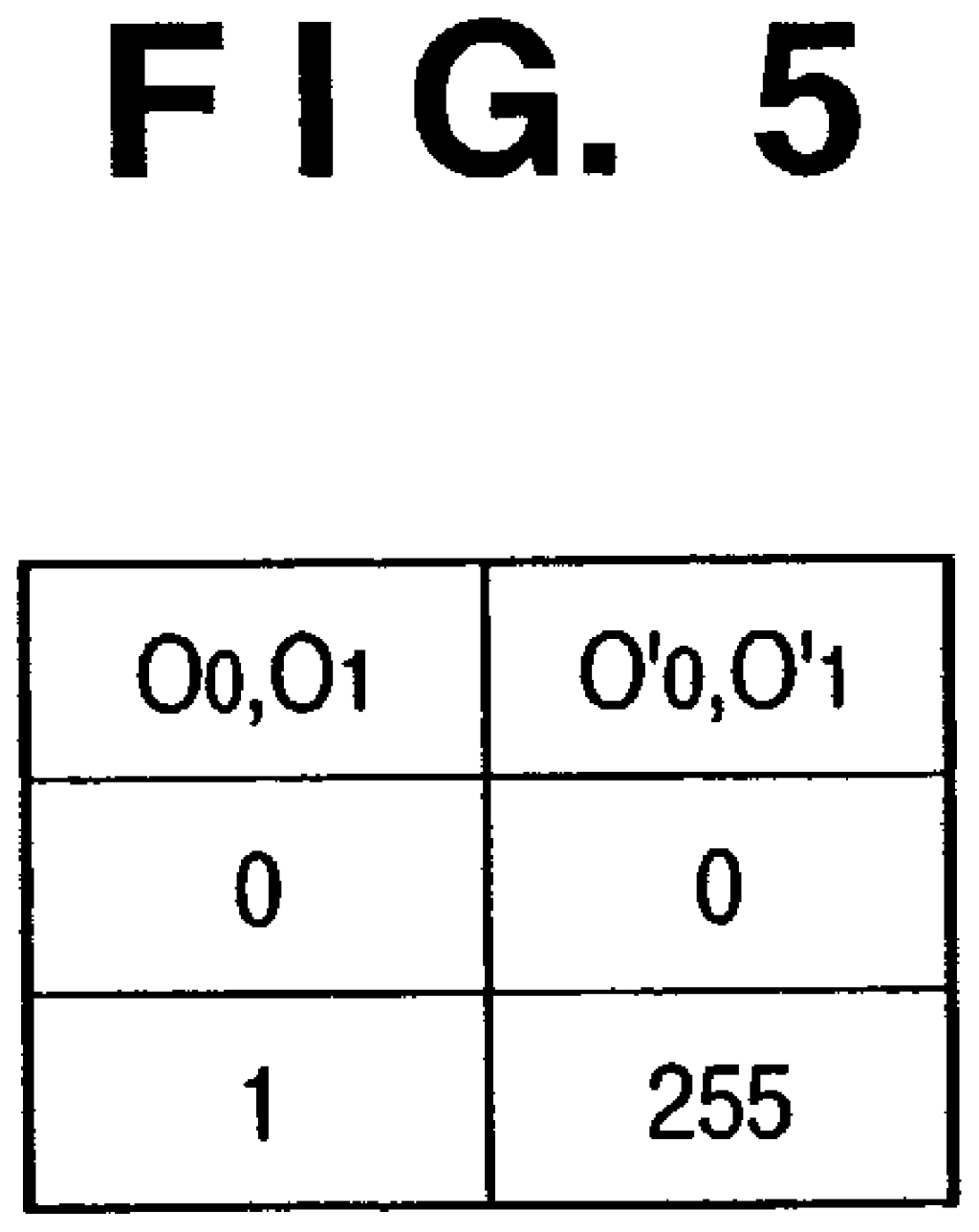

FIG. 5 is an explanatory view of relation between input value and output value in an LUT 5 in FIG. 4;

FIG. 7 is an explanatory view of relation between input value and output value in the LUT 5 according to the second embodiment;

FIG. 8 is an explanatory view of relation between two-dimensional space and output data managed by the look-up table (LUT) 4 according to a third embodiment;

FIGS. 9A and 9B are explanatory views of relation between input value and output value in the LUT 5 in the error calculators 3-0 and 3-1 according to the third embodiment;

FIG. 10 is an explanatory view of input/output relation of LUTs 7-0 and 7-1 in FIG. 2 according to the first embodiment;

FIG. 11 is an explanatory view of the input/output relation of LUTs 7-0 and 7-1 in FIG. 2 according to the second embodiment;

FIG. 14 is an explanatory view of input/output relation of LUTs 12-0 and 12-1 in FIG. 12;

DETAILED DESCRIPTION OF THE PREFERRED EMBODIMENTS

Preferred embodiments of the present invention will now be described in detail in accordance with the accompanying drawings.

<First Embodiment>

In this embodiment, plural colors constituting a multi-value image may be respectively binarized, however, for the sake of simplification of explanation, input multivalue image data is represented in 2 colors. Further, the respective colors are 8-bit multivalue image data (256 level image data), and an apparatus which converts the image data to binary data by image processing and outputs the binary data will be described. As an output destination, any binary output device may be used. In this embodiment, a printer which performs printing by discharging/not discharging ink droplets will be described as the output destination. Further, as any input source may be used as long as it inputs multivalue image data, the input source may be a storage medium (a floppy disk, a CD-ROM or the like) for storing a multivalue image, reception via a network, or an image scanner or the like. The present embodiment is characterized by image processing for inputting and binarizing multivalue image data.

Figure 1:
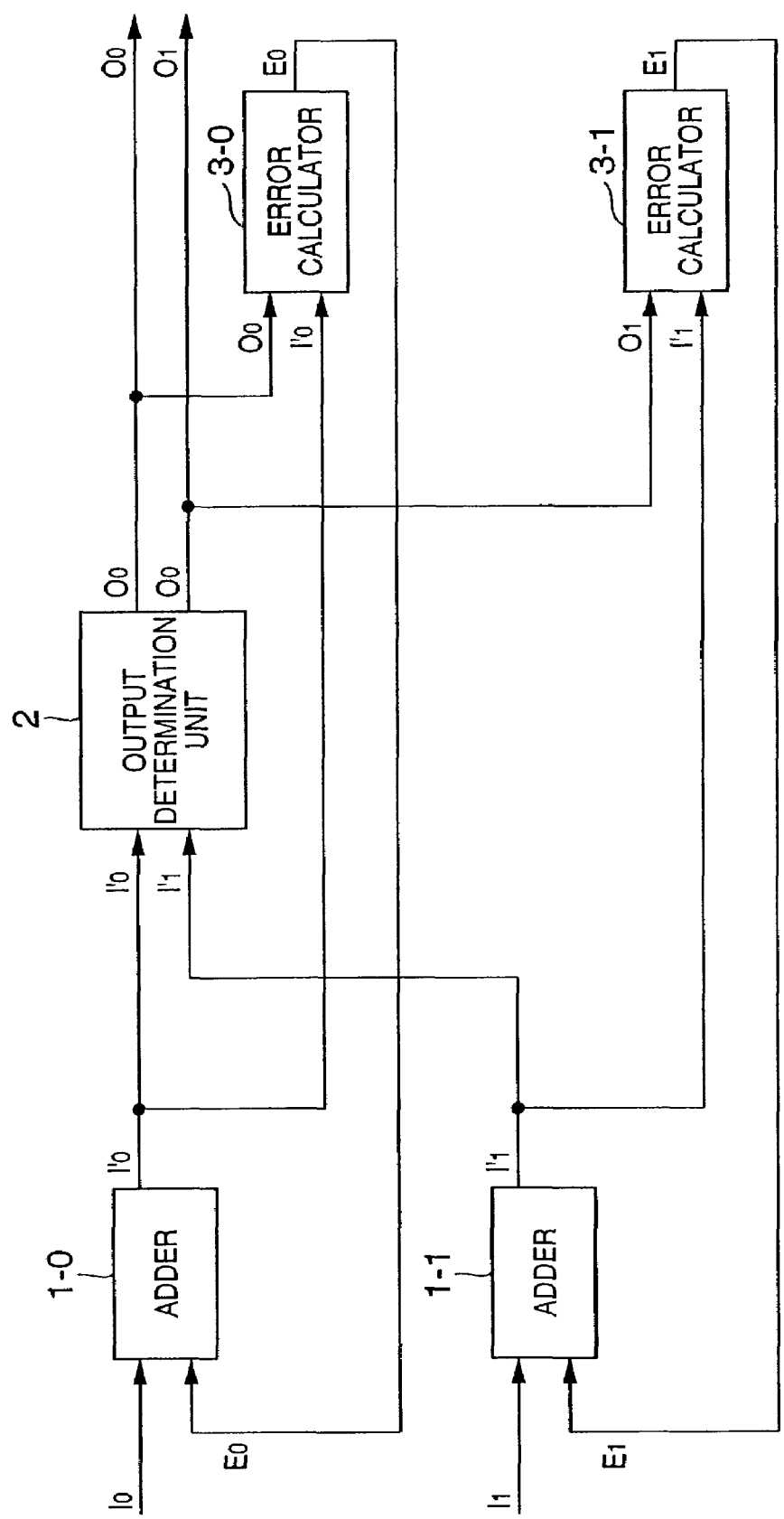
FIG. 1 is a block diagram showing the construction of image processing apparatus according to a first embodiment.

FIG. 1 a block diagram showing the construction of image processing apparatus according to the first embodiment of the present invention.

In FIG. 1, reference numerals $I_0$ and $I_1$ denote multivalue (8-bit) pixel data representing cyan and magenta colors. These multivalue pixel data $I_0$ and $I_1$ are inputted into adders 1-0 and 1-1, and added to cumulative errors $E_0$ and $E_1$ in input pixel position among errors generated in binarized pixel positions (in the present embodiment, errors generated in an immediately previous pixel position in a main scanning direction). The results of addition $I'_0$ and $I'_1$ are supplied to an output determination unit 2. Note that as the error to be added may be positive or negative value, the results of addition by the adders 1-0 and 1-1 may exceed the range of 0 to 255 even if the input pixel data $I_0$ and $I_1$ are within the range. As the range of −127 to 383 (if 128 is a threshold value, and input values equal to or greater/less than the threshold value are set to 0/1, 0 to 255+128, −127 is sufficient range, therefore the range is set as 0 to 255±128) is sufficient, if the number of bits is increased upon input of +127, respectively 9-bit data are outputted as $I'_0$ and $I'_1$.

Figure 2:
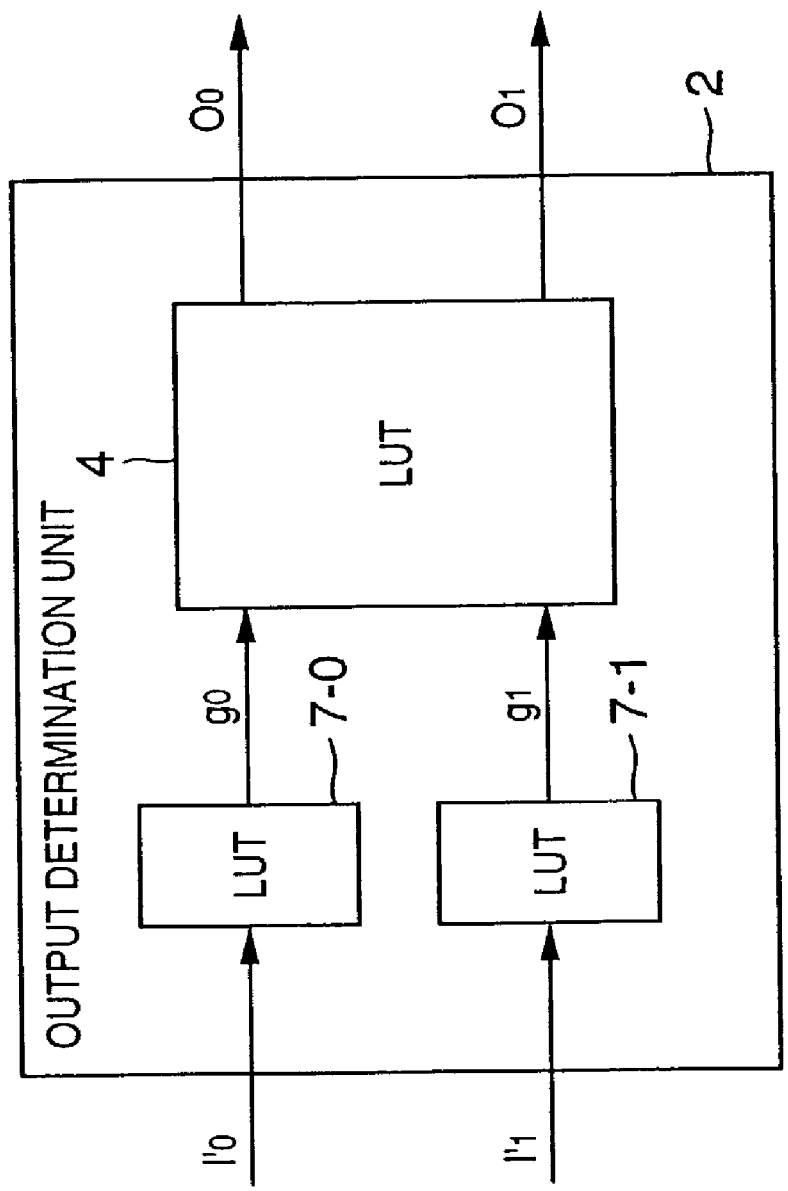
FIG. 2 is a block diagram showing the construction of output determination unit in FIG. 1.

As shown in FIG. 2, the output determination unit 2 has three look-up tables (LUTs) 7-0, 7-1 and 4 for binarization.

First, the background of the construction in this figure will be described.

In the present embodiment, two color multivalue pixel data are inputted and respectively binarized. Assuming that the two color binarized data are represented as (first color, second color), only four (0,0), (0,1), (1,0) and (1,1) data exist.

As described above, as the data $I'_0$ and $I'_1$, to which the errors distributed to the position of pixel of interest are added, respectively require 9 bits, the total number of bits of these data is 18. In a case where the 18 bit data are inputted and one of the above 2-bit data is determined, as a $2 \times 2^{18} = 524388$ bit memory is required for the LUTs and address wiring pattern for 18 bits are required, cost reduction cannot be attained. Further, as color image printing requires at least three colors, and actually it is necessary to construct LUTs by using a $2 \times 2^{27} = 268M$ bit memory, cost reduction is more difficult.

That is, since the number of types of output patterns corresponding to input values is extremely small, a more simple construction is desired.

Figure 4:
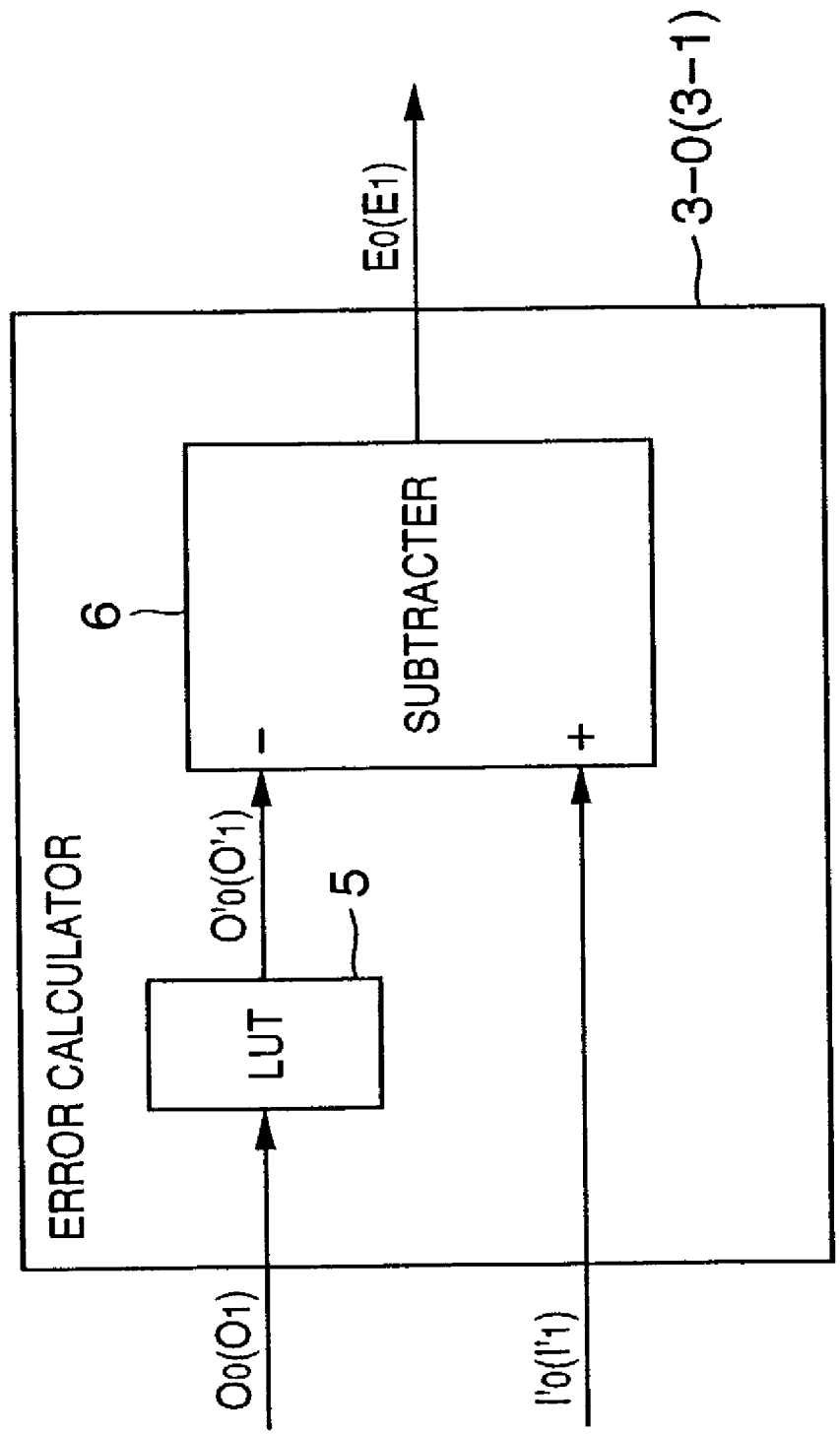
FIG. 4 is a block diagram showing constructions of error calculators 3-0 and 3-1 in FIG. 1.

Accordingly, in the present embodiment, the data $I'_0$ and $I'_1$ as the results of addition are supplied to the LUTs 7-0 and 7-1 such that the number of bits of these data is reduced as shown in FIG. 4. The LUT 7-0 (7-1) is a 1-output to 1-input type one-dimensional LUT which quantizes an input 9-bit value to a less value, e.g., one of 0 to 8 (9 values), and outputs the value. If the input multivalue data (−127 to 383) is divided into nine, the input/output relation is as follows.

| Input value | Output value |
| --- | --- |
| −127 to −96 | 0 |
| −95 to −31 | 1 |
| −32 to 31 | 2 |
| 32 to 95 | 3 |
| 96 to 157 | 4 |
| 160 to 222 | 5 |
| 223 to 286 | 6 |

-continued

| Input value | Output value |
|---|---|
| 287 to 350 | 7 |
| 351 to 383 | 8 |

To realize the above conversion, the LUTs 7-0 and 7-1 have a structure as shown in FIG. 10. In the figure, the left column shows the data $I'_0$ (or $I'_1$) inputted as an address, and the right column, the output value (stored value). As the output value is always an integer equal to or greater than 0, no code bit is required and the output value is outputted as a 4-bit output $g_0$ (or $g_1$). Since the 9-bit input is quantized to the 4-bit output, the LUT 7-0 (7-1) has a $4 \times 2^{10} = 4096$ bit memory. Note that as the LUTs 7-0 and 7-1 are 1-input LUTs, they can be regarded as one-dimensional LUTs. It is desirable that the LUTs 7-0 and 7-1 and the LUT 4 to be described later are rewritable memories.

The output values $g_0$ and $g_1$ (respectively 4-bit data) from the LUTs 7-0 and 7-1 are inputted into the LUT 4. As the LUT 4 is a 2-input LUT, it can be regarded as a two-dimensional LUT. The LUT 4 inputs the total 8-bit data as address signals, and outputs binarized signals $O_0$ and $O_1$ (total 2-bit of respectively 1-bit data). Accordingly, the LUT 4 has a $2 \times 2^8 = 512$ bit memory.

That is, in the construction, the LUTs 7-0 and 7-1 and the LUT 4 use only $2048 \times 2 + 512 = 4608$ bit memory capacity and only four outputs exist, sufficient accuracy can be attained. Further, it is apparent from the above description that in a case where 3 colors are inputted, the necessary memory capacity is extremely small in comparison with the conventional art.

The LUT 4 which inputs the values $g_0$ and $g_1$ (respectively 0 to 8 values) can be regarded as a two-dimensional LUT as described above (in case of 3-input, the LUT becomes a three-dimensional LUT; that is, it is an N-dimensional LUT to N-input).

Figure 3:
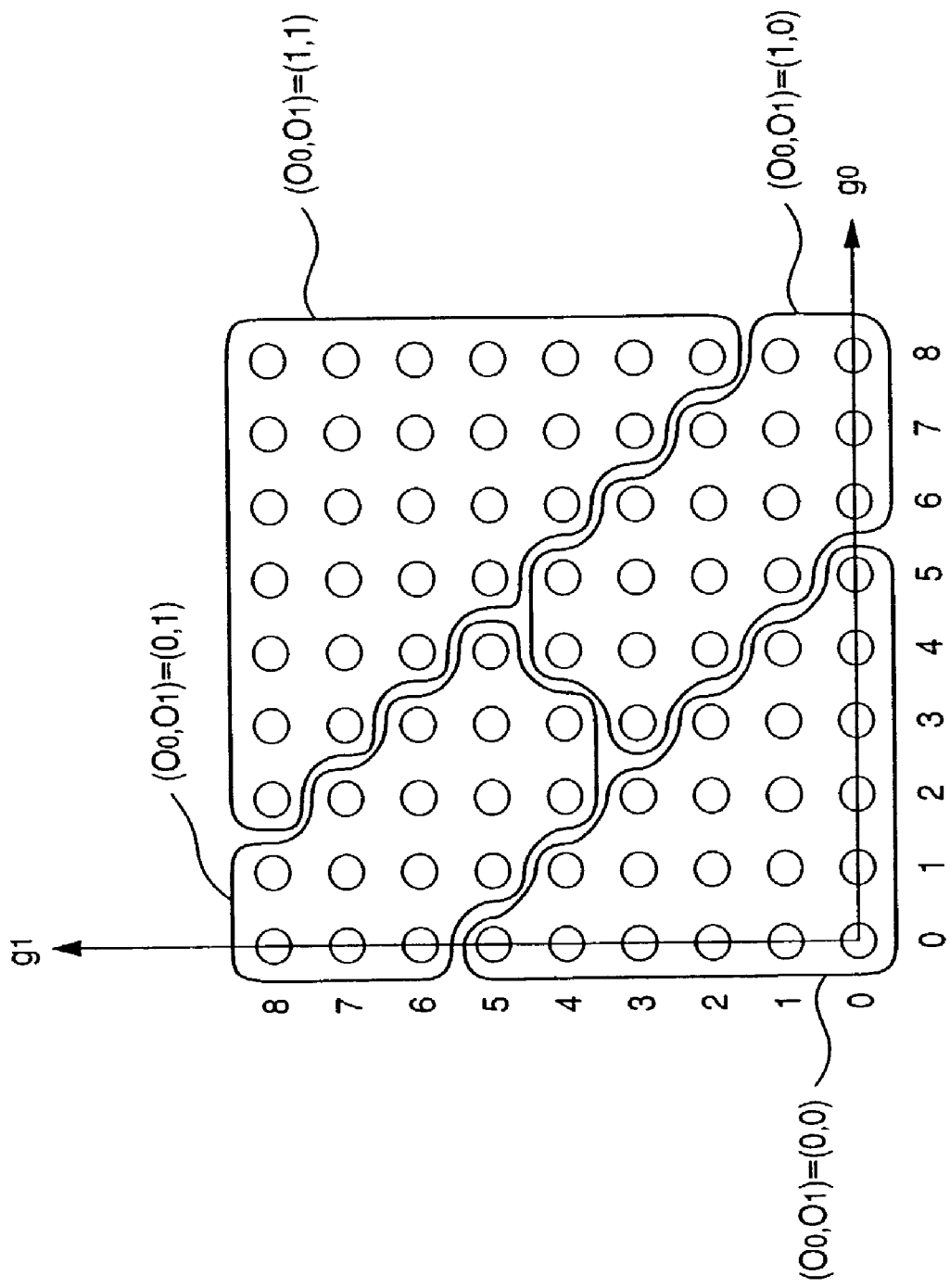
FIG. 3 is an explanatory view of relation between two-dimensional space managed by a look-up table (LUT) 4 in FIG. 2 and output data.

FIG. 3 shows binary patterns stored in the LUT 4 (relation between binary data of two types of colors and addresses).

That is, in coordinate space with the 2 inputs $g_0$ and $g_1$ as two axes, in a region where the both input values are large, binarized output values $O_0$ and $O_1$ are (1,1), and in a region where the both input values are small, the output values are (0,0); in a region where the input value $g_0$ is comparatively large and the input value $g_1$ is comparatively small, the output values are (1,0); and in a region where the input value $g_0$ is comparatively small and the input value $g_1$ is comparatively large, the output values are (0,1). The patterns are stored in the LUT 4.

Note that in a case where the coordinate space with the inputs $g_0$ and $g_1$ as axes are divided into four regions, the region of (1,1) and the region of (0,0) must not be provided in contact with each other.

Figure 16:
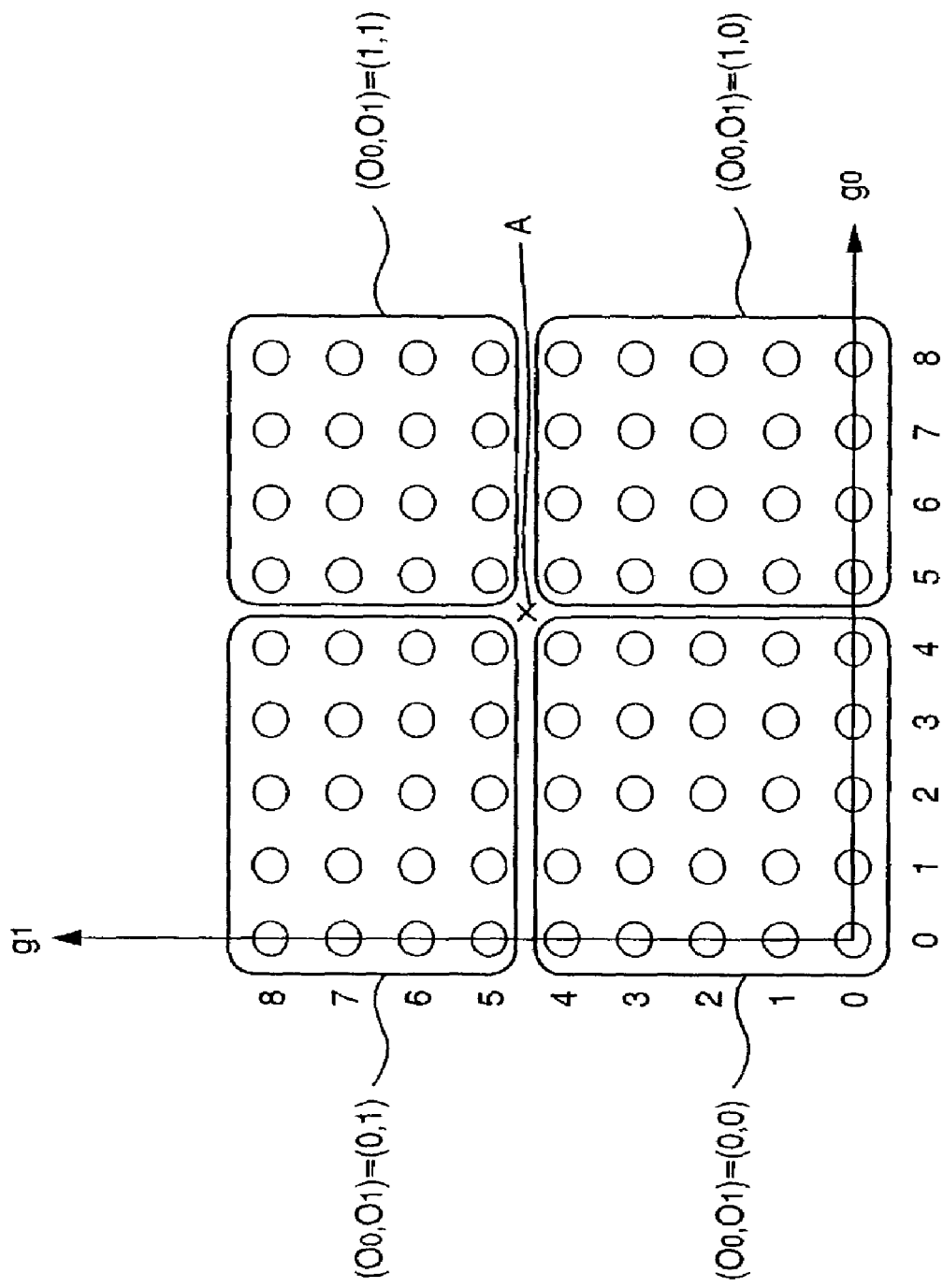
FIG. 16 is an explanatory view of relation between undesirable two-dimensional space and output data managed by the look-up table (LUT) 4 according to the first embodiment.

For example, in regions as shown in FIG. 16, a region where the binarized data values are (1,1) and a region where the binarized data values are (0,0) are in contact at a point A. By such division, an unstable pattern is provided for the data binarized from density data around the point A. That is, in a case where an image of density around the point A is continuously inputted, all the patterns can be obtained, and among then, there is a high probability that halftone pixels of mixed (0,0) and (1,1) values are outputted. In other words, the (1,1) pattern which is desirably generated in a region where the two colors both have high density, may be generated even in an intermediate density region.

Regarding this point, in FIG. 3, output values (0,0) are not generated around the (1,1) pattern, and output values become (0,0) through (1,0) and (0,1) in accordance with reduction of density. That is, it is preferable that the maximum density pattern (1,1) region and the minimum density pattern (0,0) region are away from each other, and other pattern regions are arranged therebetween.

In the LUT 4 of the present embodiment having the structure in FIG. 3, 1 point in the coordinate space is determined upon input of values $g_0$ and $g_1$, and its pattern is outputted as the output values $O_0$ and $O_1$.

Returning to the explanation of FIG. 1, the error calculator 3-0 has a construction as shown in FIG. 4. As the error calculator 3-1 has the same construction as that of the error calculator 3-0, the numeral 3-1 is bracketed in the figure.

The error calculator 3-0 has an LUT 5 in which the binarized data $O_0$ (=0 or 1) is inputted, 0 (minimum density) or 255 (maximum density) is selected and outputted as a the selected value $O'_0$. The subtracter 6 calculates the difference between the output value $O'_0$ and the value $I'_0$ of corrected pixel of interest (the value of pixel of interest to which the error is added), and outputs the calculated difference as the error $E_0$ generated in the position of the pixel of interest. The error calculator 3-1 performs the same operation.

$$E_0 = I'_0 - O'_0$$

$$E_1 = I'_1 - O'_1$$

The error $E_0$ is added by the adder 1-0 upon input of the next pixel beyond the pixel of interest. Further, the error calculator 3-1 outputs the other color error $E_1$ and the adder 1-1 performs addition.

Note that in the above example, 100% of the errors generated in the position of the pixel of interest ($E_0$, $E_1$) are added to the pixel position of the next beyond the pixel of interest, however, as in the case of general error diffusion, it may be arranged such that a memory for several lines is provided between the adder 1-0 and the error calculator 3-0 and the error is distributed to plural unbinarized pixel positions around the pixel of interest in accordance with weighting coefficients.

Further, as described above, two color multivalue pixel data are inputted in the present embodiment, however, pixel data of three or more colors may be inputted. Further, respectively 8-bit multivalue data are inputted, however, this does not pose any limitation on the present invention. That is, in FIG. 2, for example, the one-dimensional LUT 7-0 (7-1) quantizes N-bit data to M-bit data (M<N). Then, assuming that the number of colors is L, the LUT 4 is an L-dimensional look-up table which inputs L×M bit data as an address.

As described above, according to the present embodiment, in a case where plural color multivalue data are inputted and binarized, in a region where the respective densities are high, both of the respective binarized data are "1", on the other hand, in a region where the densities are intermediate, such both "1" binarized data are not outputted. That is, in a comparatively low-density region, colors do not overlap with each other, and excellent tonality can be reproduced.

In the above example, the processing is realized by hardware, however, it may be realized by software which operates on a general information processing apparatus (e.g., a personal computer).

Next, a procedure of the processing realized by software will be described with reference to the flowchart of FIG. 15.

Figure 15:
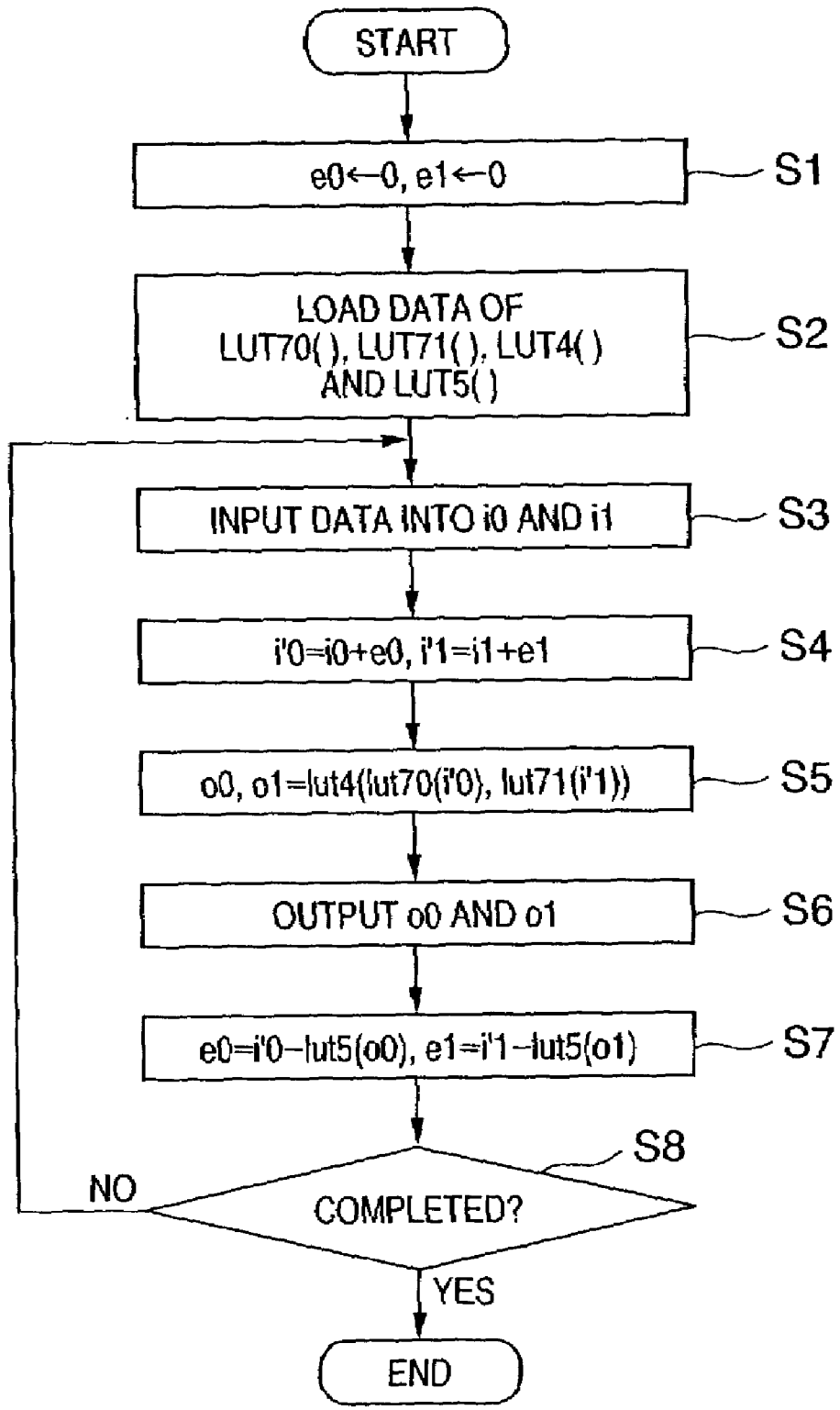
FIG. 15 is a flowchart showing a processing procedure in a case where the first embodiment is realized by software.

Note that in FIG. 15 and the subsequent figures, variables lut70( ), lut71( ), lut4( ) and lut5( ) respectively correspond to the LUTs 7-0, 7-1, 4 and 5.

First, at step S1, variables e0 and e1 for storing the respective two color error values are initialized to zero, and at step S2, conversion data previously stored as a file in a hard disk or the like is loaded and stored into the variables lut70( ), lut71( ), lut4( ) and lut5( ).

Next, at step S3, two color multivalue pixel data are inputted, and stored into variables i0 and i1, then at step S4, the calculation errors e0 and e1 are added to the variables, thereby i'0 (corresponding to I'$_0$) and i'1 (corresponding to I'$_1$) are calculated.

Next, at step S5, data of the variables lut70 (i'0) and lut71(i'1) are read and supplied to the lut4( ) as subtrahends, thereby the binarized data o1 and o1 are obtained. The results are outputted at step S6.

At step S7, the calculation errors e0 and e1 to be added to the next pixel are calculated. Then the processing at step S3 and the subsequent steps is repeated until it is determined at step S8 that processing on all the pixels has been completed.

As described above, it is apparent that the first embodiment can be realized by hardware and software.

Next, other embodiments will be described. It is also apparent that the processing of the embodiments can be realized by software.

<Second Embodiment>

In the above first embodiment, the input image data is binarized, however, tonality in ternary or more-value representation may be made depending on printer as the output apparatus. For example, a printer which performs printing by discharging ink droplets may print an image in ternary representation by discharging ink droplets 0 time, 1 time and 2 times. Otherwise, the printer may use same-color ink of different densities. In the present embodiment, an example where input image data is ternarized will be described.

In ternarization, three types of output data, 00 (=0), 01 (=1) and 10 (=2) in binary representation exist with respect to one color. Further, the basic construction of the present embodiment is the same as that of the FIG. 1 except the respective look-up tables (LUTs) 7-0, 7-1 and 4 in the output determination unit 2 and the LUT 5 in the error calculators 3-0 and 3-1.

FIG. 11 shows the addresses of the LUTs 7-0 and 7-1 and stored data according to the second embodiment. As shown in the figure, the number of addresses is smaller than that in FIG. 10 since the number of errors generated in ternarization is smaller in comparison with that in binarization. Further, the converted values are 0 to 6, however, they may be 0 to 8 as in the case of the first embodiment, or may be other values. Note that as the converted data function as addresses to the two-dimensional LUT 4, it is desirable that the range of the converted data is not wide.

Figure 6:
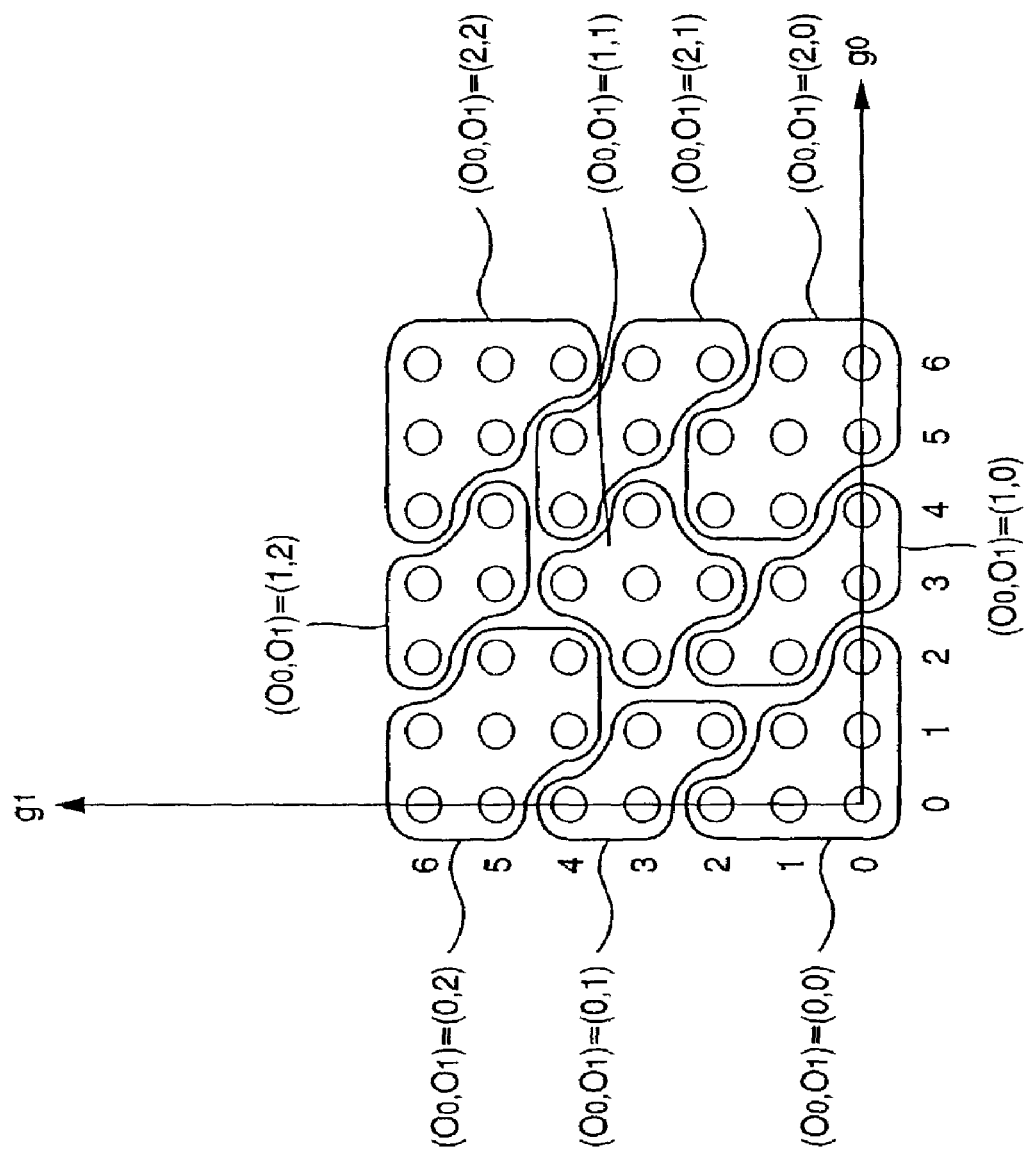
FIG. 6 is an explanatory view of relation between two-dimensional space and output data managed by the look-up table (LUT) 4 according to a second embodiment.

FIG. 6 shows data in two-dimensional space stored in the LUT 4 in the output determination unit 2. As two colors are finally respectively ternarized, the ternarized data represented as (first color, second color) are as follows.

(0,0), (0,1), (0,2),
(1,0), (1,1), (1,2),
(2,0), (2,1), (2,2)

Accordingly, in FIG. 6, the two dimensional space with the input values g$_0$ and g$_1$ as axes is divided into 9 regions. The ternarized data (2,2) is assigned to a region where two color densities are both high; (1,1), to a region where the two color densities are both intermediate; and (0,0), to a region where the two color densities are both low. Further, the other ternary data are assigned to corresponding density regions. Further, as in the case of the first embodiment, the maximum density output values become the minimum density output values through transitional steps in accordance with reduction of density.

Figure 7:
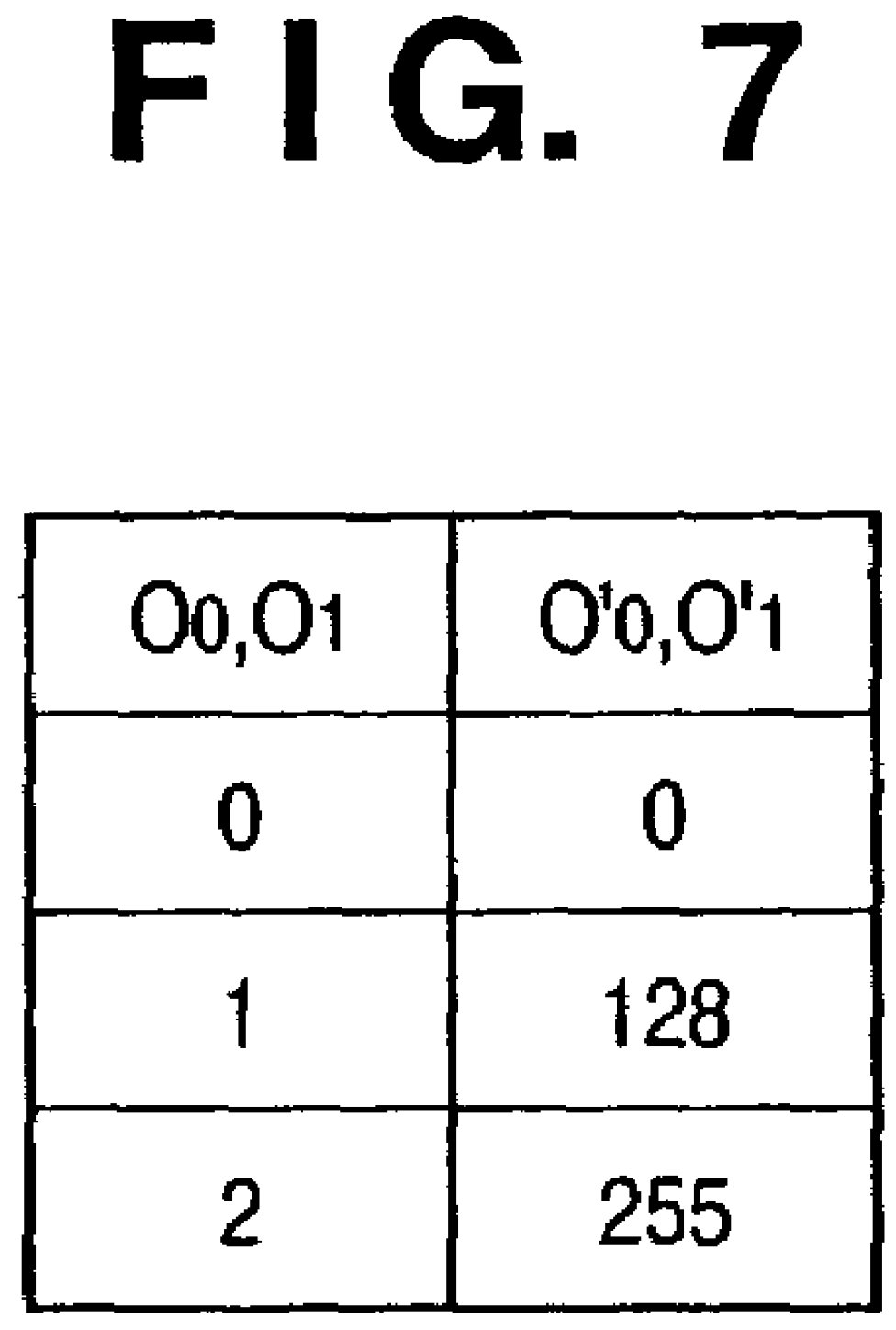

As the ternarized data, the respectively colors have 0, 1 and 2 values. Since the data "0" indicates the minimum density, it corresponds to the level 0; "2" indicating the maximum density corresponds to the level 255; and "1" indicating an intermediate density corresponds to the level 128, as shown in FIG. 7.

Accordingly, in the second embodiment, in the error calculator 3-0 (3-1), if the input ternarized data O$_0$ is 0, 0 is outputted from the LUT 5; if the input ternarized data O$_0$ is 1, 128 is outputted; and if the input ternarized data O$_0$ is 2, 255 is outputted. Since the other processing is the same as that of the first embodiment, the details thereof will be omitted.

Note that also in the second embodiment, the input data is not limited to two color multivalue data, but three or more color data may be inputted.

<Third Embodiment>

Generally, in a printer which prints a color image, printing is performed by using printing color materials of yellow (Y), magenta (M) and cyan (C) (further, black (Bk) may be added).

Regarding yellow, as human eye's sensitivity to this color is not so high, there is no problem if tonality representation of this color is lower than that of magenta and cyan. In the present third embodiment, input plural color data are not quantized to color data respectively having the same number of bits but quantized to color data respectively having different numbers of bits.

The apparatus according to the third embodiment is substantially the same as that in FIG. 1 except the respective LUTs.

For the sake of simplification of explanation, two color data are inputted as in the case of the above embodiments, and the first color is ternarized and the second color is binarized, on the presumption that human's visual perception to the first color is higher than to the second color.

In this case, the quantized data represented as (first color, second color) are:

(0,0), (0,1),
(1,0), (1,1),
(2,0), (2,1)

Accordingly, in the output determination unit 2, the one-dimensional LUT 7-0 has the contents as shown in FIG. 11, and the one-dimensional LUT 7-1, the contents as shown in FIG. 10.

Further, in the two-dimensional LUT 4, the space represented by the input g$_0$ and g$_1$ is divided into 6 regions, the above quantized patterns are assigned to the corresponding regions, and the patterns are stored as shown in FIG. 8.

Figures 9A, 9B:
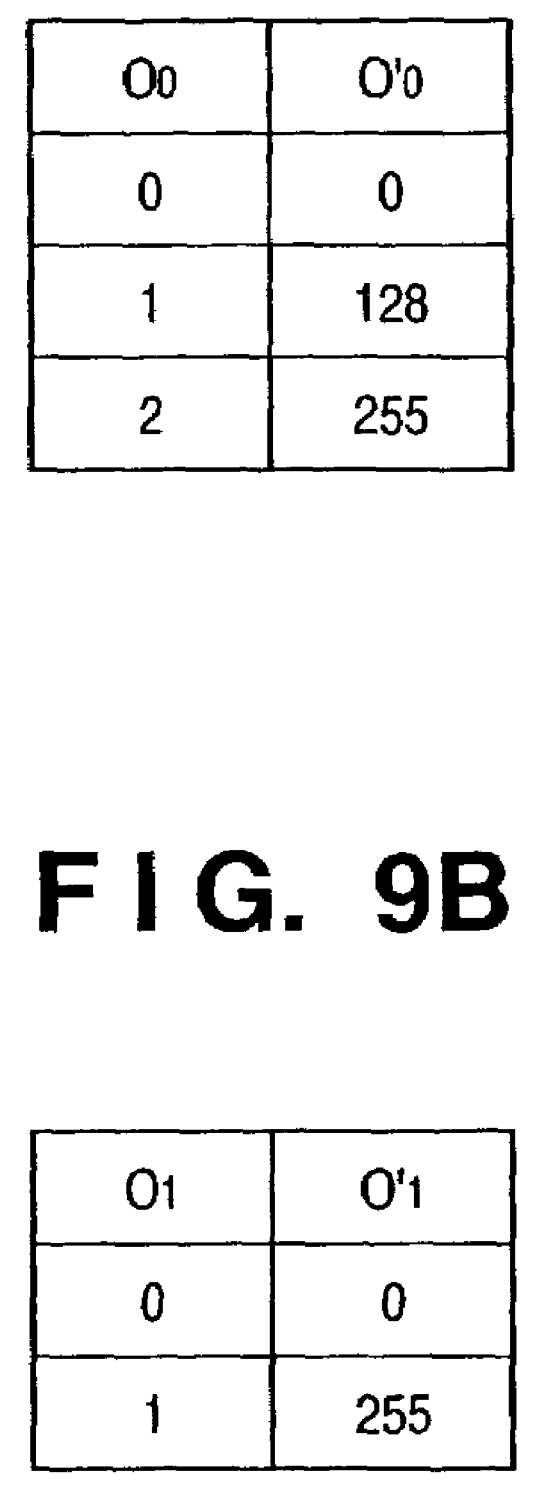

Further, as the data O$_0$ inputted into the LUT5 in the error calculator 3-0 is a ternary value, i.e., one of 0, 1 and 2, one of 0, 128 and 255 is outputted to one of the 0, 1 and 2 as shown in FIG. 9A.

Further, as the data O$_1$ inputted into the LUT5 in the error calculator 3-1 is a binary value, i.e., one of 0 and 1, one of 0 and 255 is outputted to one of the 0 and 1 as shown in FIG. 9B.

As a result, according to the third embodiment, regarding a color to which human visual perception is low, sufficient tonality representation can be maintained with reduced number of bits of quantized data. Further, the number of bits of address to the LUT 4 can be reduced. As a result, the apparatus can be constructed with a reduced memory capacity.

Note that in the third embodiment, two color data is inputted, but it is apparent from the above description that the input data is not limited to two color multivalue data, but three or more color data may be inputted. Accordingly, the description of the third embodiment is not limited to two colors.

<Fourth Embodiment>

In the above first to third embodiments, a grid point nearest to an input value is selected and the value on the grid point is employed as an output value. That is, an output pattern is determined based on an output pattern region formed with discrete coordinates as shown in FIGS. 3, 6 and 8. In other words, even if an output value stands in a boundary between regions, the value is rounded to one of the regions.

Accordingly, in the fourth embodiment, 4 grid point values or 3 grid point values around an input value are referred to, interpolated with appropriate weights and a final output is determined, and a pattern appropriate to an input value in a boundary between regions is determined.

Figure 12:
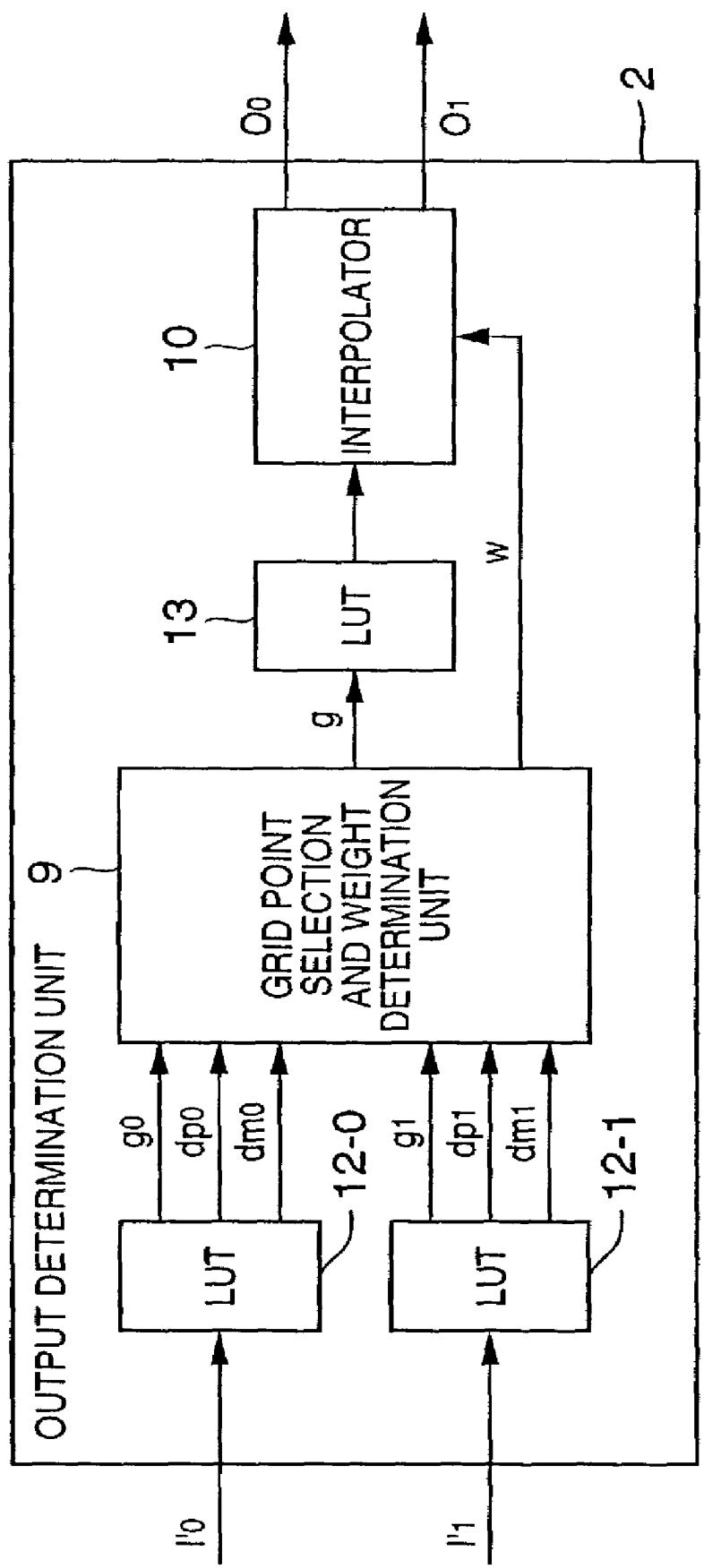
FIG. 12 is a block diagram showing the construction of the output determination unit according to a fourth embodiment.

FIG. 12 is a block diagram showing the construction of the output determination unit 2 to refer to 3 grid point values and interpolate these values, and to obtain an output value (binary value in the fourth embodiment).

In FIG. 12, numerals 12-0 and 12-1 denote LUTs corresponding to the one-dimensional LUTs 7-0 and 7-1 in the first to third embodiments; and 13, an LUT corresponding to the two-dimensional LUT 4.

In the fourth embodiment, respective output values $dp_0$, $dm_0$ and $dp_1$, $dm_1$, in addition to the values $g_0$ and $g_1$, are outputted from the LUTs 12-0 and 12-1. The LUTs 12-0 and 12-1 has a data structure as shown in FIG. 14.

A grid point selection and weight determination unit 9 inputs these data, and determines 3 grid points, nearest to the initial coordinates (often stand in an intermediate position in 9×9 grid) $I'_0$ and $I'_1$ of the pixel of interest in a 9×9 grid (similar to that in FIG. 3) managed by the LUT 13, and addresses the LUT 13, 3 times, to obtain binary data of the 3 grid points.

Figure 13:
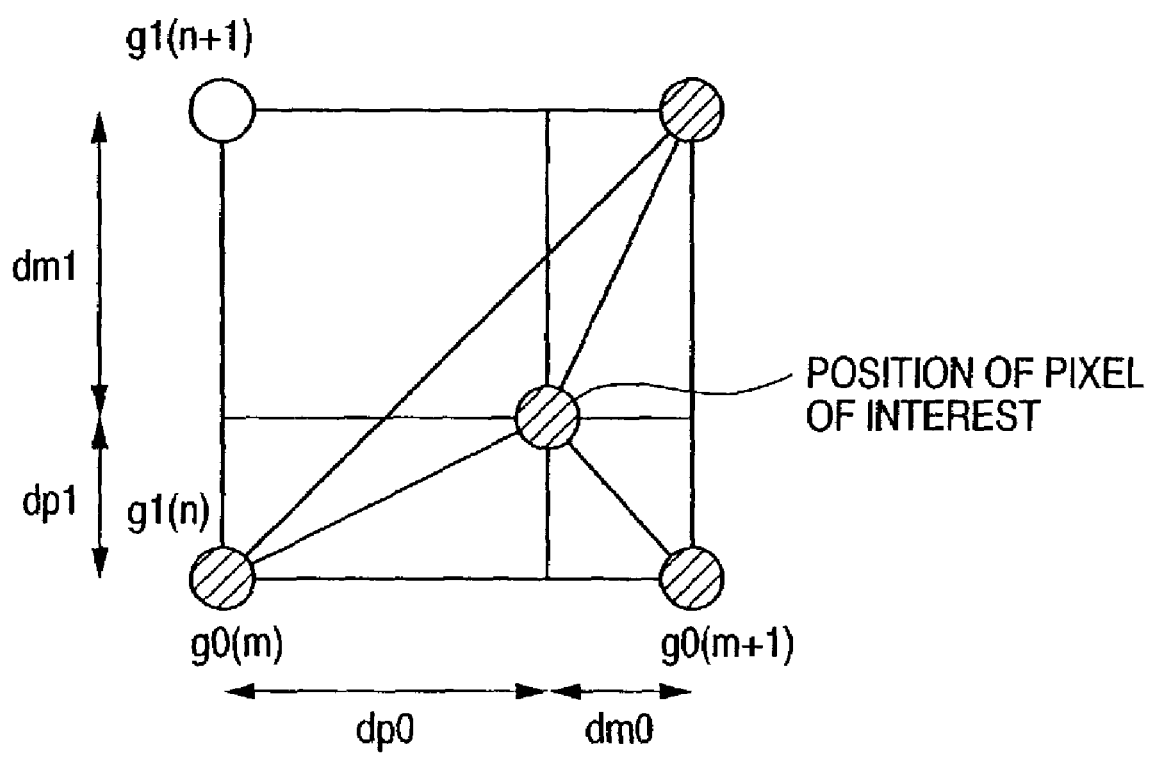
FIG. 13 is an explanatory view of interpolation processing according to the fourth embodiment.

FIG. 13 shows the relation between the above 3 grid points and the coordinates $I'_0$ and $I'_1$.

An interpolation unit 10 determines binary data in the position of pixel of interest in FIG. 13 by using the three data outputted from the LUT 13 and weight coefficients (x and y coordinates) determined by $dp_0$ and $dm_0$ and $dp_1$ and $dm_1$.

Note that in the fourth embodiment, the interpolation is made by using 3 points, however, the interpolation may be made by using 4 points.

It will be easily understood that the above-described fourth embodiment effectively functions in, e.g., binarization in a boundary between regions in FIG. 3.

Further, in the fourth embodiment, the interpolation upon binarization has been described, however, the interpolation is particularly applicable to ternarization or more-value quantization.

In the first to fourth embodiments, the output destination is a printer, however, as long as it is an output destination apparatus by error-diffusion processing, a binary or ternary CRT, or in some cases, a storage device (floppy disk or the like) for temporarily storing image data to be outputted to an output apparatus may be employed as the output destination. Further, any device may be employed as the image data input source.

Further, as the respective embodiments can be realized by software, the present invention includes a computer program within is scope. Generally, to execute a computer program on a computer, a storage medium such as a floppy disk or CD-ROM holding the program is set in the apparatus, and the program is duplicated or installed from the storage medium into the hard disk of the apparatus. Accordingly, it is apparent that the present invention includes such storage medium within its scope.

As described above, the present invention provides image processing apparatus and method and computer-readable storage medium with general versatility, for flexible quantization on multivalue image data of two or more colors to image data having a reduced number of bits in correspondence with the number of bits to be quantized, by using an error diffusion scheme.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which quantizes $N(N \geq 2)$ color multivalue image data to data where each of color data representing said multivalue image data has a smaller number of bits, comprising:

addition means for adding errors generated by quantization of respective colors to respective color multivalue data;

a first look-up table for converting the results of addition by said addition means into multivalue data of smaller number of bits;

a second look-up table for inputting output values of the respective colors from said first look-up table as N-dimensional addresses and outputting N quantized data; and calculation means for calculating differences between the quantized data outputted from said second look-up table and the respective colors added by said addition means, as errors to be added to unquantized pixel positions.

2. The image processing apparatus according to claim 1, wherein in N-dimensional space managed by said second look-up table, if respective color multivalue data outputted from said first look-up table are divided into values representing high, intermediate and low densities, a region where all the colors have the high density and a region where all the colors have the low density are not in contact with each other.

3. The image processing apparatus according to claim 1, wherein said quantization is binarization.

4. The image processing apparatus according to claim 1, wherein said quantization is made to obtain plural color data respectively having different values.

5. The image processing apparatus according to claim 4, wherein said quantization is made to reduce the number of bits of data representing a color to which human visual perception is low, to a smaller number than that of data representing a color to which human visual perception is high.

6. The image processing apparatus according to claim 1, wherein interpolation coefficients are further outputted from said first look-up table so as to complement accuracy of coordinate position of the respective colors added by said addition means in the N-dimensional space managed by said second look-up table, and wherein said apparatus further comprises interpolation means for interpolating the quantized data outputted from said second look-up table in accordance with said interpolation coefficients.

7. An image processing method for quantizing $N(N \geq 2)$ color multivalue image data to data where each of color data representing said multivalue image data has a smaller number of bits, comprising:
- an addition step of adding errors generated by quantization of respective colors to respective color multivalue data;
- a first conversion step of performing conversion by using a first look-up table for converting the results of addition at said addition step into multivalue data of smaller number of bits;
- a second conversion step of performing conversion by using a second look-up table for inputting output values of the respective colors obtained at said first conversion step as N-dimensional addresses and outputting N quantized data; and
- a calculation step of calculating differences between the quantized data obtained at said second conversion step and the respective colors added at said addition step, as errors to be added to unquantized pixel positions.

8. A computer program embodied in a computer readable medium which quantizes $N(N \geq 2)$ color multivalue image data to data where each of color data representing said multivalue image data has a smaller number of bits, comprising:
- program code of addition process for adding errors generated by quantization of respective colors to respective color multivalue data;
- program code of first conversion process for performing conversion by using a first look-up table for converting the results of addition at said addition process into multivalue data of smaller number of bits;
- program code of second conversion process for performing conversion by using a second look-up table for inputting output values of the respective colors obtained at said first conversion process as N-dimensional addresses and outputting N quantized data; and
- program code of calculation process for calculating differences between the quantized data obtained at said second conversion process and the respective colors added at said addition process, as errors to be added to unquantized pixel positions.

* * * * *